(12) United States Patent
Gaerke et al.

(10) Patent No.: US 8,931,797 B2
(45) Date of Patent: Jan. 13, 2015

(54) TRANSPORT TRAILER WITH FOUR WHEEL STEERING

(71) Applicant: J. & M. Manufacturing Co., Inc., Fort Recovery, OH (US)

(72) Inventors: Joshua P. Gaerke, Fort Recovery, OH (US); James E. Wood, Fort Recovery, OH (US); Andrew A. Gartin, Montpelier City, IN (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 149 days.

(21) Appl. No.: 13/692,216

(22) Filed: Dec. 3, 2012

(65) Prior Publication Data

US 2014/0151977 A1   Jun. 5, 2014

(51) Int. Cl.
*B62D 13/04*   (2006.01)

(52) U.S. Cl.
CPC ..................................... *B62D 13/04* (2013.01)
USPC ......................................................... 280/444

(58) Field of Classification Search
USPC .................................. 280/442, 443, 444, 445
See application file for complete search history.

(56) References Cited

U.S. PATENT DOCUMENTS

| 1,160,499 | A | * | 11/1915 | Fageol | 280/444 |
| 3,806,160 | A | * | 4/1974 | Duerksen | 280/444 |
| 5,090,719 | A | * | 2/1992 | Hanaoka | 280/408 |
| 5,477,937 | A | * | 12/1995 | Chagnon | 180/24.01 |
| 6,308,976 | B1 | * | 10/2001 | Mitchell | 280/419 |
| 7,874,571 | B2 | * | 1/2011 | Frey et al. | 280/442 |
| 2007/0090625 | A1 | * | 4/2007 | Skiles | 280/442 |
| 2012/0217723 | A1 | * | 8/2012 | Smith | 280/444 |

* cited by examiner

*Primary Examiner* — Kevin Hurley
(74) *Attorney, Agent, or Firm* — Jacox, Meckstroth & Jenkins

(57) ABSTRACT

An elongated trailer has a frame with longitudinally extending frame members connected by front and rear cross frame members, and a pair of wheels are pivotally connected to opposite ends of each of the front and rear cross frame members. A steering system includes a front steering crank member connected to a tow bar and supported by the front cross frame member for pivotal movement on a vertical axis, and a rear steering crank member is supported by the rear cross frame member for pivotal movement on a vertical axis. A set of tie rods pivotally connect the front and rear crank members to the corresponding front and rear wheels. An elongated link member or rod connects the front and rear crank members and extends longitudinally of the frame substantially above the bottom surfaces of the frame members to protect the steering system from projecting objects on the ground.

6 Claims, 3 Drawing Sheets

TRANSPORT TRAILER WITH FOUR WHEEL STEERING

BACKGROUND OF THE INVENTION

This invention relates to a transport trailer of the general type disclosed in U.S. Pat. No. 6,047,989 which issued to the assignee of the present invention and the disclosure of which is herein incorporated by reference. This type of transport trailer is commonly used for transporting elongated agriculture equipment such as a removable and interchangeable head for a self-propelled combine. The trailer is pulled by a tractor or other vehicle and may have four wheel steering, for example, as disclosed in U.S. Pat. No. 3,806,160 and U.S. Pat. No. 7,874,571. In a trailer with four wheels steering, the front steering mechanism is controlled by a tow bar or tongue used to tow the trailer, and the rear steering mechanism is connected to the front steering mechanism by a connecting member or rod which extends longitudinally of the trailer. The steering mechanisms and the connecting rod causes the rear pair of wheels to turn in the same direction as the front pair wheels, for example, as disclosed in the above '160 and '571 Patents. When the front and rear cross frame members also function as axles to support the pivotal stub-axles for the front pair of wheels and rear pair of wheels, commonly the steering mechanism includes steering components which project below or adjacent the bottom surfaces of the frame members and are exposed to being impacted by an elevated railroad crossing or a rock or stump or other obstruction in a field and projecting upwardly from the ground. The impacting can damage a steering mechanism and/or connecting rod and require that the trailer be repaired or rebuilt. Damage to the steering mechanism or rod may also prevent the trailer from being used and require that the trailer be transported by a truck or another trailer to a facility for repair.

SUMMARY OF THE INVENTION

The present invention is directed to an elongated trailer for transporting agricultural equipment and includes an elongated frame having longitudinally extending frame members rigidly connected by a front axle or cross frame member or axle and a rear cross frame member or axle, and a set of wheels are pivotally connected to opposite ends of each axle or cross frame member. A pivotal movement on a substantially vertical axis, and a forwardly projecting tow bar is connected to the front crank member for pivoting the front crank member. The steering system also includes a rear crank unit or member supported by the rear cross frame member for pivotal movement on a substantial vertical axis, and each crank member is connected to pivot its corresponding pair of wheels by a set of tie rods. An elongated connecting rod or link member has opposite end portions pivotally connected to the front and rear crank members and is effected to pivot the rear wheels in response to pivoting the front wheels. The link member extends longitudinally substantially above the bottom surfaces of the front and rear cross frame member for protecting the link member and crank members from being impacted and damaged by an obstruction projecting above the ground.

Other features and advantages of the invention will be apparent from the following description, the accompanying drawings and the appended claims.

DESCRIPTION OF THE ILLUSTRATED EMBODIMENT

Figure 1:
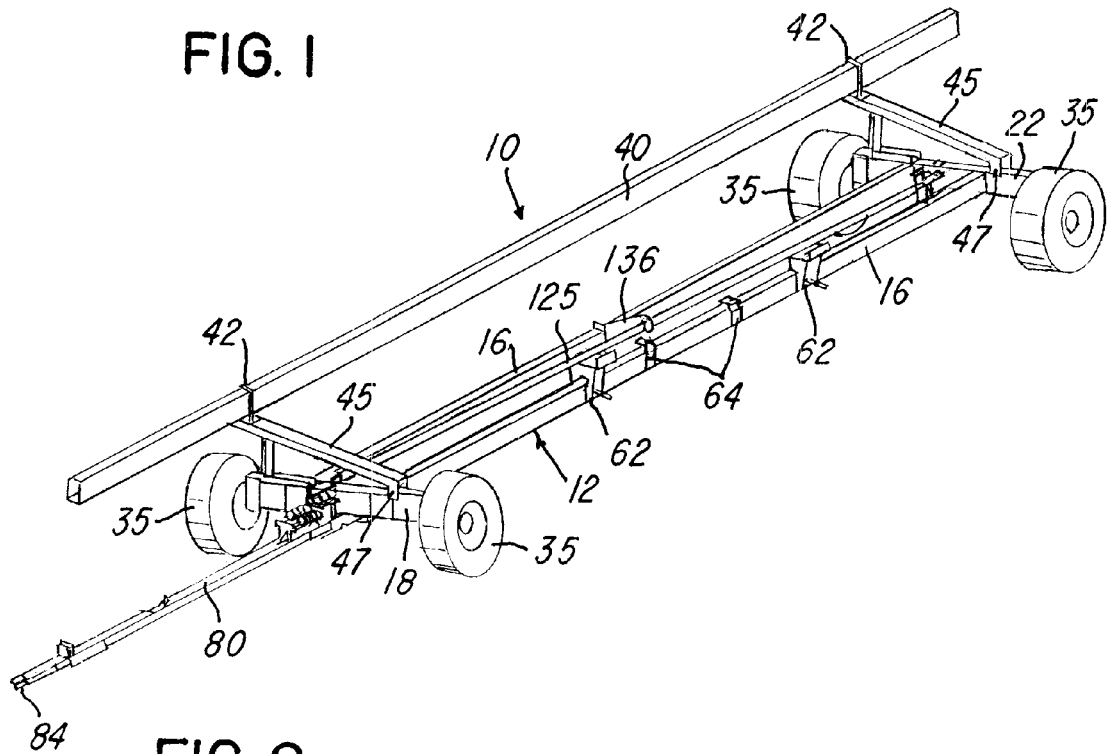
FIG. 1 is a perspective view of an elongated transport trailer constructed in accordance with the invention.

FIG. 1 illustrates a transport trailer 10 constructed in accordance with the invention and which is ideally suited for transporting a removable and interchangeable head for a self-propelled combine and which head may have substantial length up to 40 feet or more. The trailer has a fabricated steel frame 12 formed by two elongated longitudinally extending frame members 16 which have opposite end portions rigidly secured to a front axle or cross frame member 18 (FIG. 2) and to a rear axle or cross frame member 22 (FIG. 3). The frame member 16, 18 and 22 are preferable tubular with the cross frame members 18 and 22 having greater height than the longitudinal frame members 16 and 18. The opposite ends of each longitudinal frame member 16 have welded end plates 24 which are connected to the cross frame members 18 and 22 by bolts which also extend through back up plates 26. The opposite end portions of each cross frame member or axle 18 and 22 receive C-shape yoke members 28 which are pivotally connected by vertical bolts or kingpins 32 which also extend through C-shaped support brackets 33 welded to the ends of the cross frame members. Each of the yoke members 28 supports an outwardly projecting horizontal stub-axle 34 on which is mounted a rubber tire wheel 35. Each of the yoke members 28 also has a rearwardly projecting flat pivot arm 38 (FIG. 4) to provide for pivoting the corresponding wheel on the vertical axis of the kingpin 32.

The frame 12 supports an elongated and longitudinally extending equipment support rail 40 (FIGS. 1 & 2) which is used to connect the trailer to the equipment being transported by the trailer. Opposite end portions of the rail 40 are connected by U-bolts 42 to adjustable arms 45 which are pivotally connected to the cross frame members 18 and 22 by pins 47. The arms 45 are supported by braces 51 having upper end portions pivotally connected to the arms 45 and lower end portions retained within channels 53 attached to the top surface of the cross frame members 18. Retractable pins 54 and adjustment holes 56 in each channel 53 provide for positioning the incline of the arms 45 to adjust the height of the support rail 40 as needed for the equipment. One of the longitudinal frame members 16 preferably supports one or more head support units 62 (FIG. 1) and one or more head hold down units 64 which are preferably constructed as disclosed in above-mentioned U.S. Pat. No. 6,047,989 for positively supporting and securing the equipment head to the trailer 10.

Figure 2:
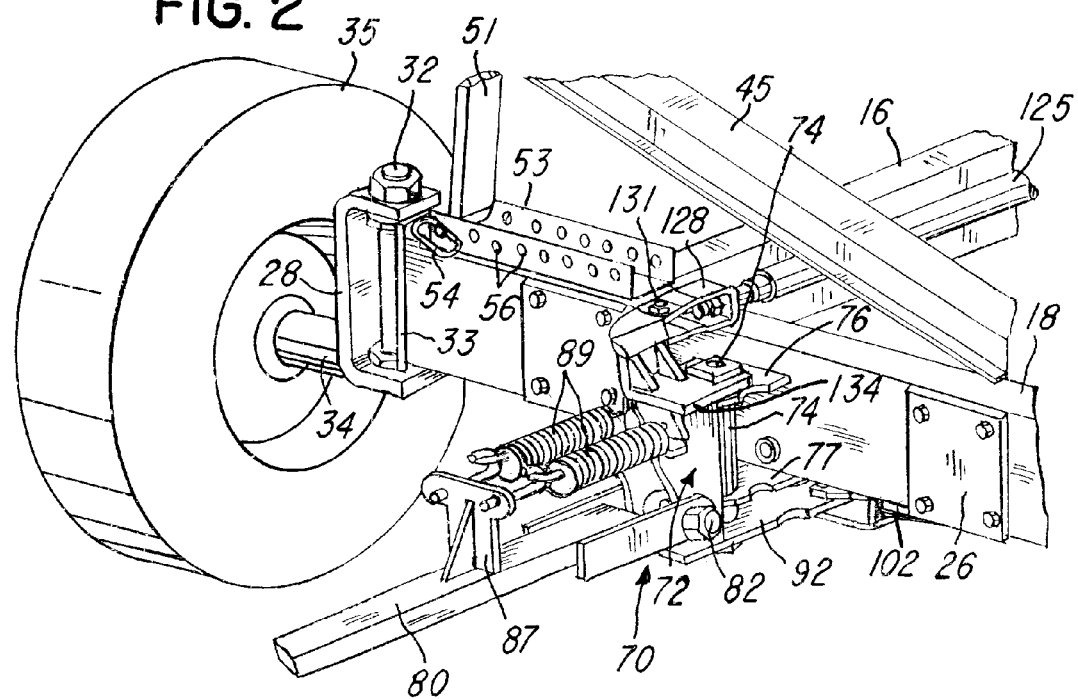
FIG. 2 is a fragmentary perspective view of the front axle or cross frame member and showing the front portion of a steering system constructed in accordance with the invention.
Figure 3:
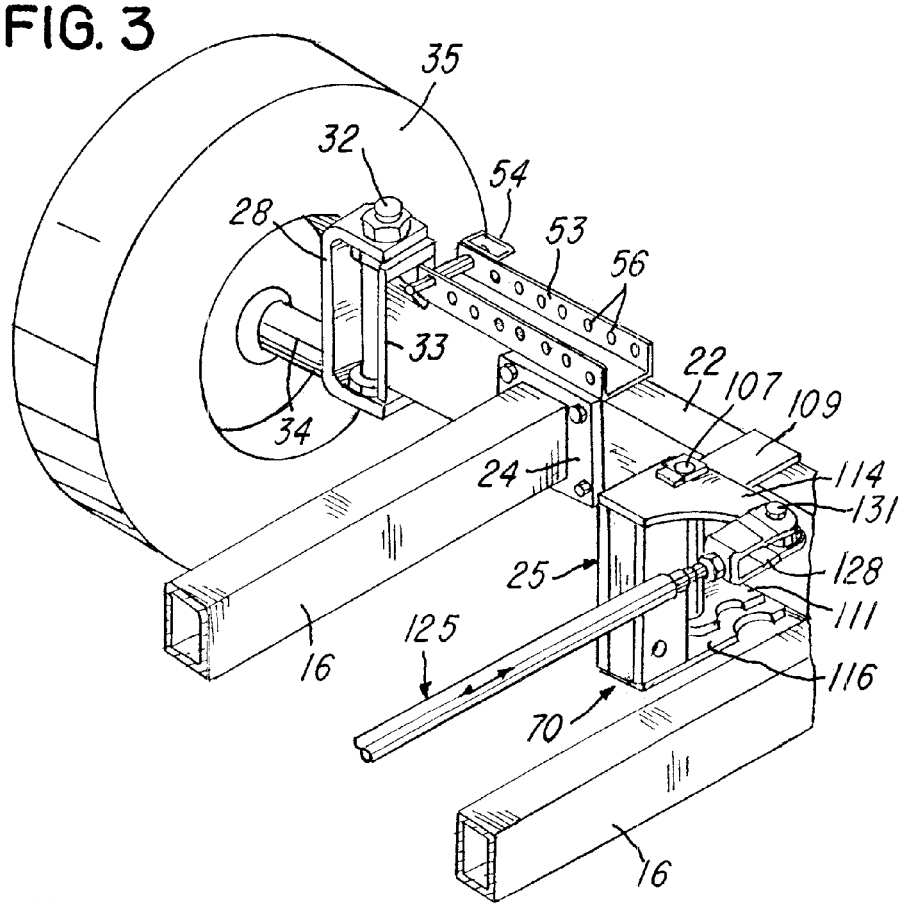
FIG. 3 is a fragmentary perspective view of the frame and a pivotal rear wheel and showing a rear portion of the steering system including the link member or rod which connects the front and rear portions and the steering system.
Figure 5:
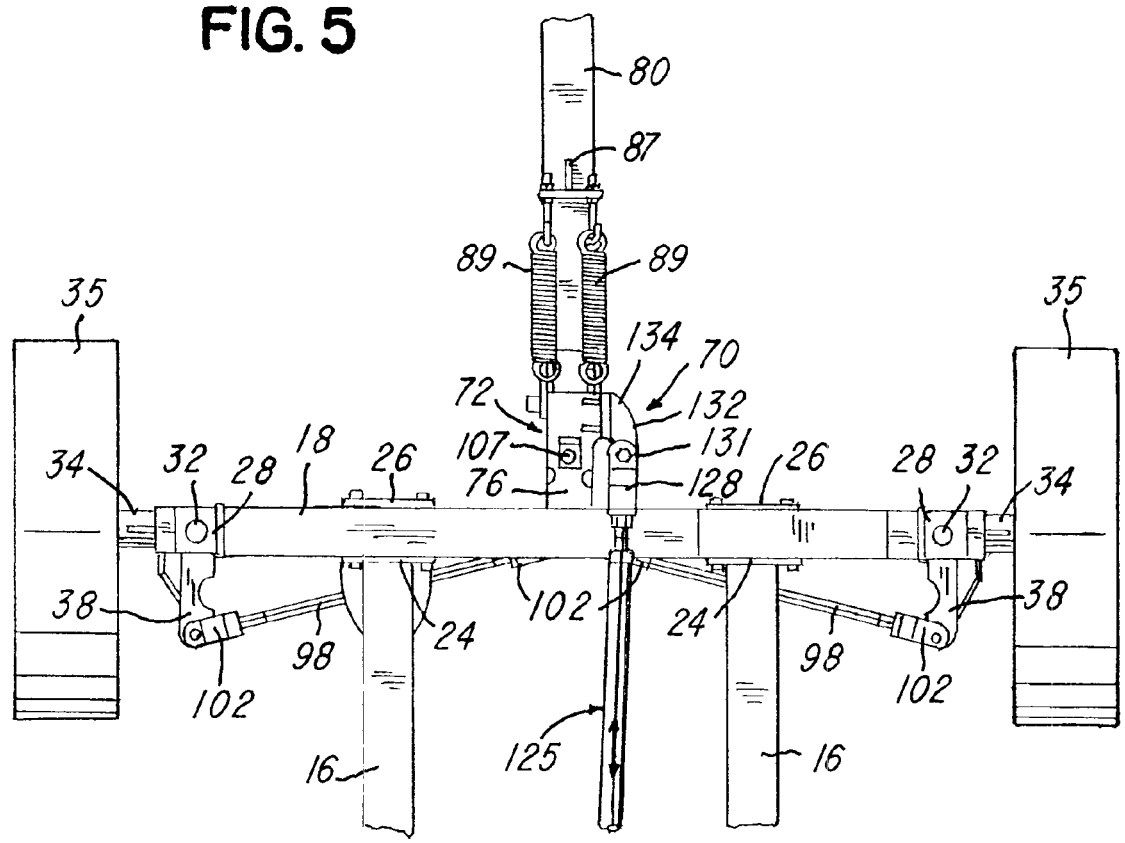
FIG. 5 is a fragmentary plan view of the front portion of the transport trailer.

Referring to FIGS. 2 and 5, a steering system 70 is constructed in accordance with the invention and includes a steel fabricated front crank unit or member 72 supported for rotation on a vertical axis of a shaft or pin 74 supported by vertically spaced horizontal plates 76 and 77 welded to the front surface of the axle or cross frame member 18. The crank member 72 supports a generally horizontal tongue or tow bar 80 for pivotal movement on a horizontal axis of a pivot bolt 82 which extends horizontally through the crank member 72 The tow bar 80 has a hitch 84 (FIG. 1) which is used for towing the wagon 10 with a tractor or other tow vehicle. A bracket 87 is welded to the tow bar 80 and is connected to the front crank member 72 by a pair of tension springs 89 which help to counter balance the weight of the tow bar 80.

The fabricated steel front crank unit or member 72 also includes a flat bottom plate 92 which projects rearwardly under the front axle or cross frame member 18 and has pivot connections with U-shape fittings 102 (FIG. 5) threadably connected to the inner end portions of a pair of tie rods 98. The tie rods 98 have outer end portions threadably connected to U-shape fittings 102 pivotally connected to the rearwardly projecting arms 38 of the yoke members 28 supporting the front pair of wheels 35. Thus when the front crank member 72 and the tow bar 80 are pivoted horizontally, the front wheels 35 pivot for turning the trailer.

Figure 4:
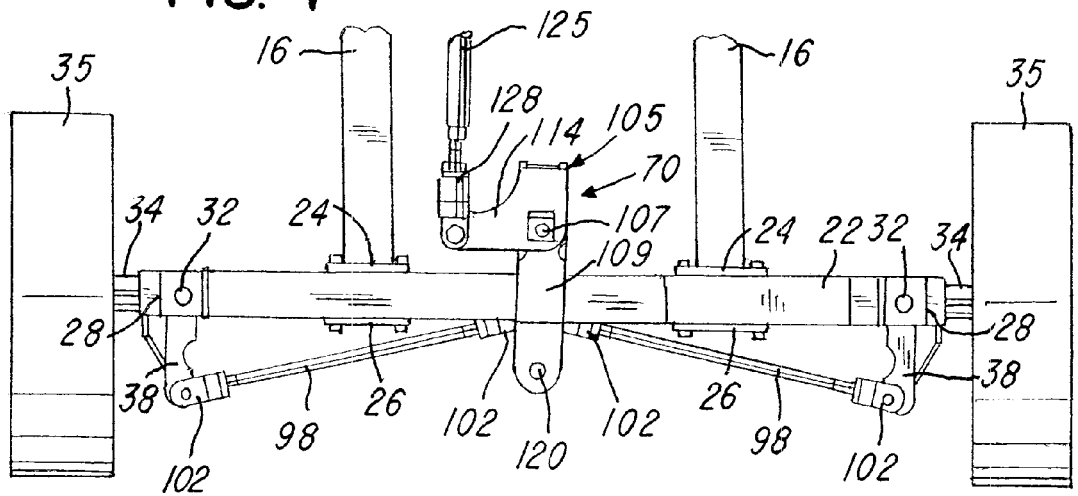
FIG. 4 is a fragmentary plan view of the rear portion of the transport trailer.

Referring to FIGS. 3 & 4, the steering system 70 also includes a fabricated steel rear crank unit or member 105 which is pivotally supported by a vertical shaft or pin 107 supported by an upper flat plate 109 and lower flat plate 111 welded to the top and bottom of the rear axle or cross frame member 22. The rear crank member 105 includes an upper flat plate 114 which projects laterally from the support pin 107 above the top surface of the cross frame member 22 to form a pivot arm. A bottom plate 116 of the crank member 105 projects rearwardly under the rear axle or cross frame member 22 and is pivotally connected to U-shaped fittings 102 (FIG. 4) threaded onto another set of tie rods 98 having outer end portions threadably connected to fittings 102 pivotally connected to the rearwardly projecting arms 38 of the yoke members 28 supporting the rear set of wheels 35 for pivotal movement on the vertical axis of the kingpins 32. Thus pivoting of the rear crank member 105 produces pivoting movement of the rear wheels 35 on the vertical axis of the kingpins 32. As also shown in FIG. 4, the flat bottom support plate 111 for the pivot shaft or pin 107 projects rearwardly from the rear axle or cross frame member 22 and has a vertical hole 120 for receiving a pin of a hitch on a tow bar of another vehicle being towed by the trailer 10.

As shown in FIGS. 1-5, the front crank member 72 and the rear crank member 105 are connected for simultaneous pivotal movement by an elongated tie rod or link member 125 which extends longitudinally of the frame 12 above the frame member 16, 18 and 22. As shown in FIGS. 2 & 5, the front end portion of the link member 125 projects above the top surface of the front axle or cross frame member 18 and is threadably connected to a U-shaped fitting 128 pivotally connected by a bolt 131 to a flat horizontal top plate 132 of a bracket 134 forming part of the front crank member 72. As shown in FIGS. 3 & 4, the rearward end portion of the tie rod or link member 125 is threadably connected to an adjustable U-shaped fitting 128 pivotally connected to the arm 114 of the rear crank member 105 by the pivot pin or bolt 131.

As shown in FIG. 1, a center portion of the link member 125 is supported for sliding axial movement within a bearing supported by an arm 136 projecting laterally inwardly from one of the longitudinal frame members 16. Thus the construction of the steering system 70 causes the front pair of wheels 35 and the rear pair of wheels 35 to pivot simultaneously in the same direction in response to horizontal movement of the tow bar 80. In addition, the steering system 70 has most of the front crank member 72 and the rear crank member 105 and especially the tie rod or link member 125 positioned substantially above the bottom surfaces of the longitudinal frame members 16 and cross frame members or axles 18 and 22. As a result, the front crank member 72 and the rear crank member 105 and the link member 125 are protected by the frame members from an impact by a rock or tree stump or other object projecting above the ground. Thus the possibility of damage to the steering system 70 of the trailer from such an object is substantially reduced or eliminated, thereby permitting continued use of the transport trailer.

While the form of transport trailer herein described constitutes a preferred embodiment of the invention, it is to be understood that the invention is not limited to this precise form of trailer, and that changes may be made therein without departing from the scope and spirit of the invention as defined in the appended claims.

What is claimed is:

1. A trailer adapted for transporting agricultural equipment over the ground and along a road, said trailer comprising
an elongated frame including longitudinally extending frame members connected by a front cross frame member and a rear cross frame member,
front wheels pivotally connected to said front cross frame member and rear wheels pivotally connected to said rear cross frame member,
a steering system including a front crank member connected to said front cross frame member and supported for horizontal pivotal movement and further including a forwardly projecting tow bar connected to pivot said front crank member,
a set of front tie rods pivotally connecting said front crank member to said front wheels for pivoting said front wheels in response to horizontal pivoting movement of said tow bar,
said steering system further including a rear crank member connected to said rear cross frame member and supported for horizontal pivotal movement,
a set of rear tie rods pivotally connecting said rear crank member to said rear wheels for pivoting said rear wheels in response to pivoting said rear crank member,
a longitudinally extending elongated link member having a first end portion pivotally connected to said front crank member and a second end portion pivotally connected to said rear crank member and effective to pivot said rear wheels in response to pivoting said front wheels,
said link member extending substantially above bottom surfaces of said front cross frame member and said rear cross frame member to protect said link member from being impacted by an object projecting above the ground,
said front crank member is supported by a bracket mounted on and in front of a front surface of said front cross frame member, and
said tow bar is connected to said front crank member for pivotal movement on a horizontal axis.

2. A trailer as defined in claim 1 wherein said first end portion of said link member extends above and over a top surface of said front cross frame member.

3. A trailer adapted for transporting agricultural equipment over the ground and along a road, said trailer comprising
an elongated frame including longitudinally extending frame members connected by a front cross frame member and a rear cross frame member,
front wheels pivotally connected to said front cross frame member and rear wheels pivotally connected to said rear cross frame member,
a steering system including a front crank member mounted on a front surface of said front cross frame member and supported for horizontal pivotal movement and further including a forwardly projecting tow bar connected to pivot said front crank member, a set of front tie rods pivotally connecting said front crank member to said front wheels for pivoting said front wheels in response to horizontal pivoting movement of said tow bar, said steering system further including a rear crank member mounted on a front surface of said rear cross frame member and supported for horizontal pivotal movement, a set of rear tie rods pivotally connecting said rear crank member to said rear wheels for pivoting said rear wheels in response to pivoting said rear crank member, a longitudinally extending elongated link member having a first end portion pivotally connected to said front crank member and a second end portion pivotally connected to said rear crank member and effective to pivot said rear wheels in response to pivoting said front wheels, said link member extending substantially above bottom surfaces of said front cross frame member and said rear cross frame member and above and over said front cross frame member to protect said link member from being impacted by an object projecting above the ground, and said tow bar is connected to said front crank member for pivoting movement on a horizontal axis.

4. A trailer as defined in claim 3 wherein said front crank member includes a flat bottom plate projecting rearwardly under said front cross frame member, and said front tie rods are pivotally connected to said bottom plate.

5. A trailer as defined in claim 3 wherein said rear crank member includes a flat bottom plate projecting rearwardly under said rear cross frame member, and said rear tie rods are pivotally connected to said bottom plate.

6. A trailer as defined in claim 3 wherein said first end portion and said second end portion of said link member are positioned above top surfaces of said front cross frame member and said rear cross frame member of said frame.

\* \* \* \* \*